H. B. McCABE.
TIME CONTROLLED SWITCH MECHANISM FOR ELECTRIC CIRCUITS.
APPLICATION FILED OCT. 10, 1912.
1,129,996.
Patented Mar. 2, 1915.
4 SHEETS—SHEET 1.
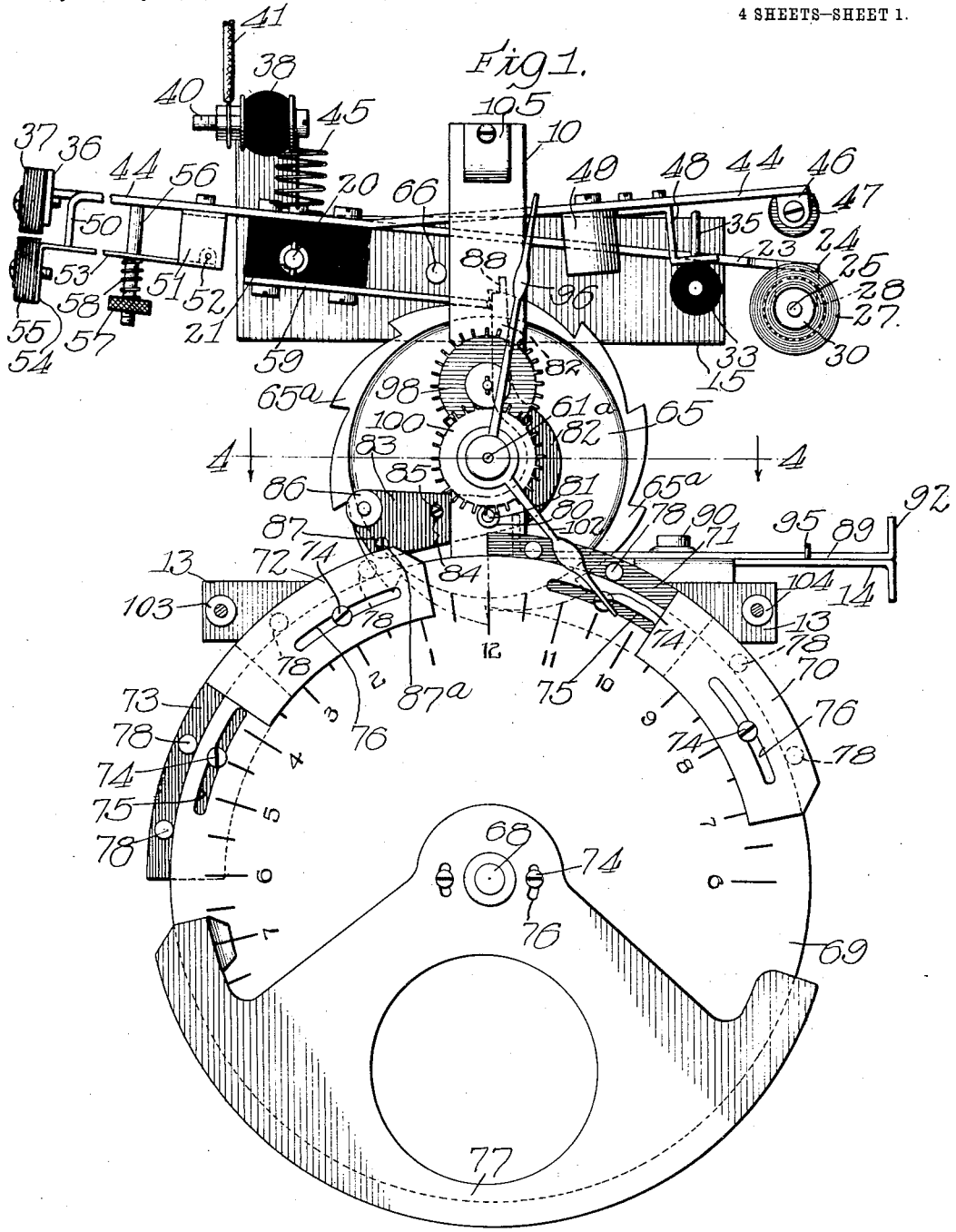
Witnesses:
Inventor:
Horace B. McCabe
By Brown Hopkins Nissen & Sprinkle
Attys.

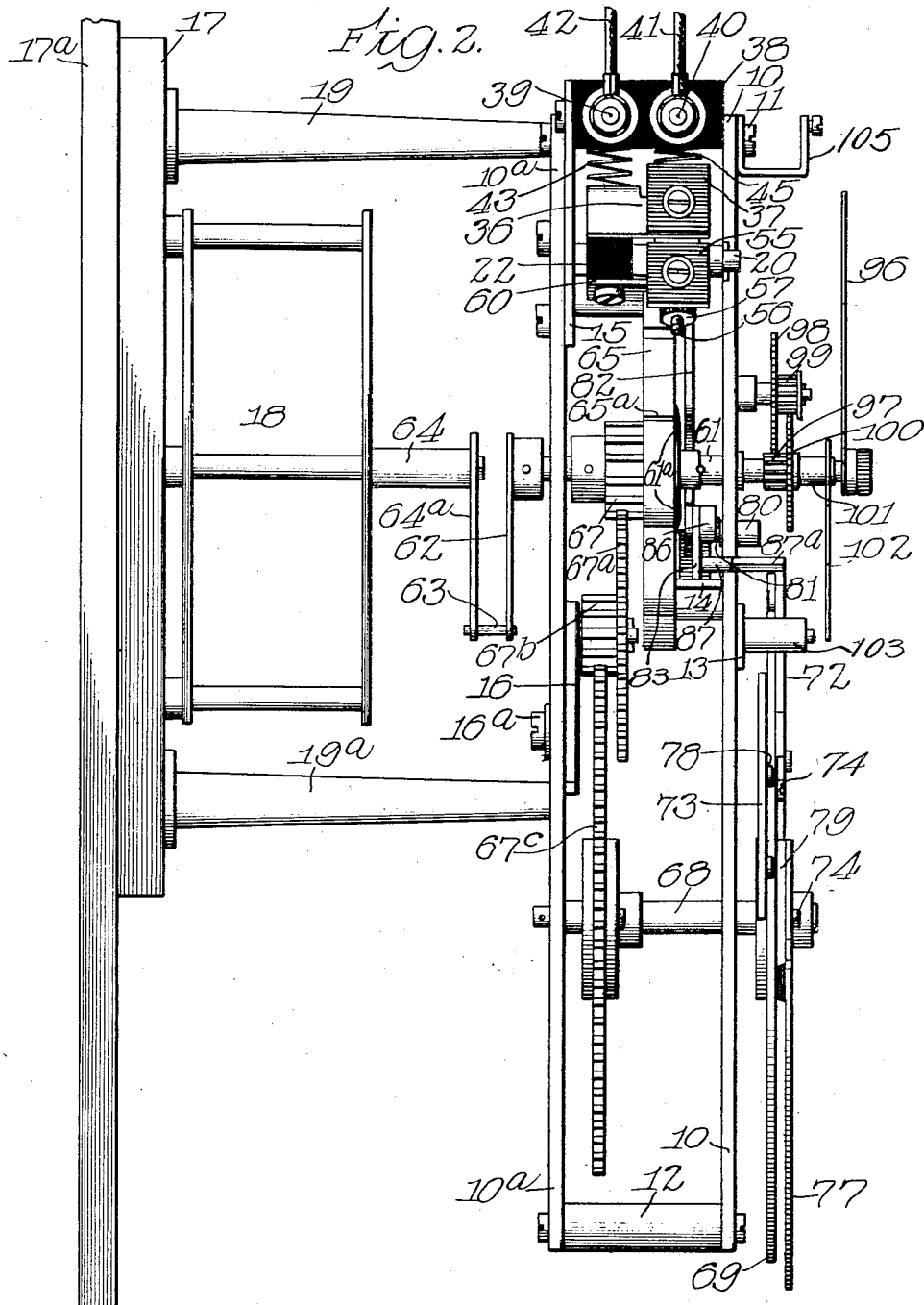

H. B. McCABE.
TIME CONTROLLED SWITCH MECHANISM FOR ELECTRIC CIRCUITS.
APPLICATION FILED OCT. 10, 1912.
1,129,996.
Patented Mar. 2, 1915.
4 SHEETS—SHEET 3.
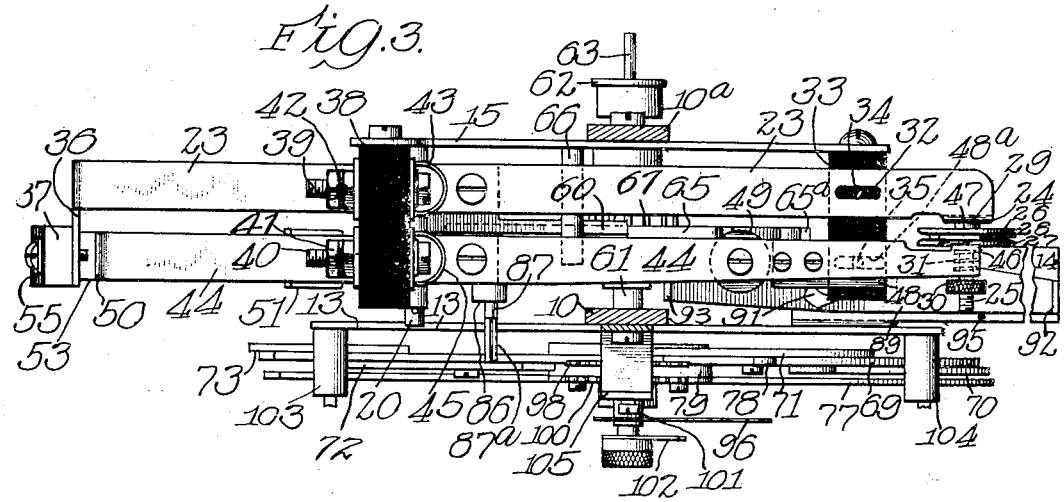
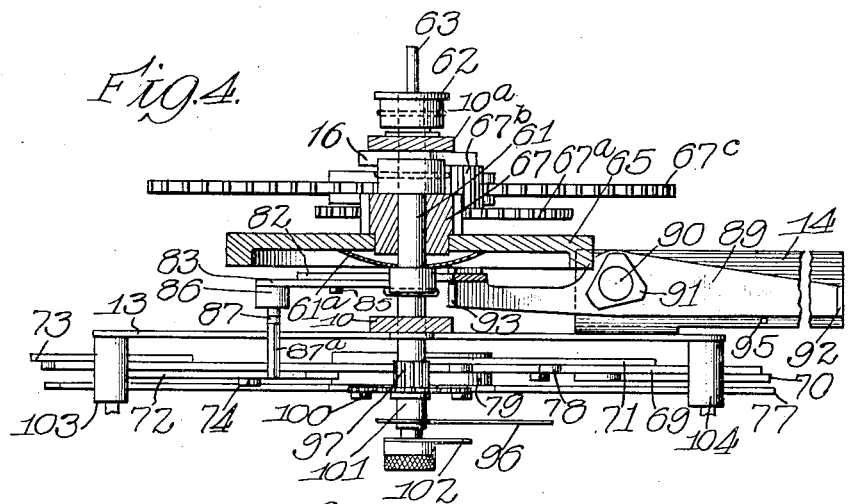
Witnesses:
Inventor
Horace B. McCabe H. B. McCABE.
TIME CONTROLLED SWITCH MECHANISM FOR ELECTRIC CIRCUITS.
APPLICATION FILED OCT. 10, 1912.
1,129,996.
Patented Mar. 2, 1915.
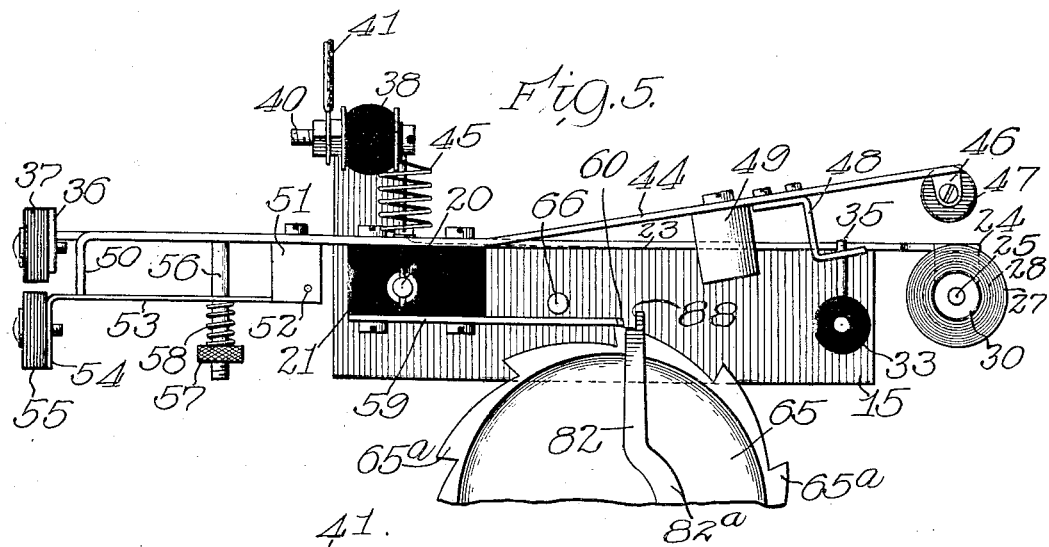
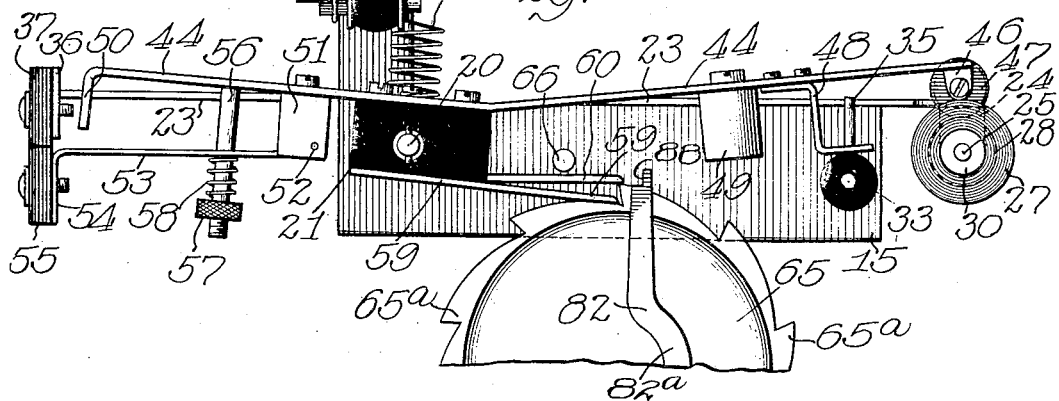
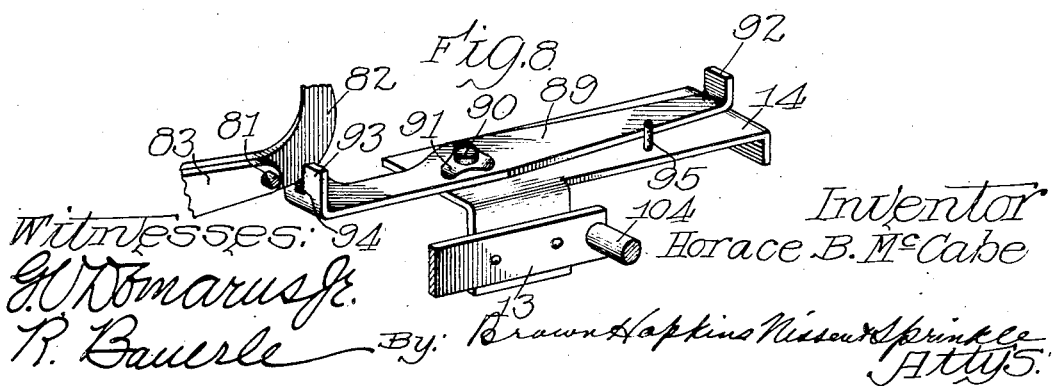
Witnesses:
Inventor
Horace B. McCabe

UNITED STATES PATENT OFFICE.

HORACE B. McCABE, OF CHICAGO, ILLINOIS, ASSIGNOR TO GISHOLT MACHINE COMPANY, OF MADISON, WISCONSIN, A CORPORATION OF WISCONSIN.

TIME-CONTROLLED SWITCH MECHANISM FOR ELECTRIC CIRCUITS.

1,129,996.  Specification of Letters Patent.  Patented Mar. 2, 1915.

Application filed October 10, 1912. Serial No. 724,910.

*To all whom it may concern:*

Be it known that I, HORACE B. McCABE, a citizen of the United States, residing at Chicago, in the county of Cook and State of Illinois, have invented certain new and useful Improvements in Time-Controlled Switch Mechanism for Electric Circuits, of which the following is a specification.

My invention relates to time controlled switch mechanism for electric circuits, and has for its primary object the provision of an improved time controlled switch mechanism for electric circuits which shall have means for periodically operating an electric circuit or circuits and means for arresting said periodic operation at intervals.

A further object is to provide a circuit closing and opening switch which may be operated by a clock movement as a motor for same and which will at the same time be comparatively powerful, devoid of small delicate parts, contacts, etc., and which will not require a fine adjustment and will not readily become out of adjustment.

Further it is an object to provide a switch which will give a positive metallic contact on closing the circuit and have a substantial and durable means for breaking the circuit between auxiliary blocks of carbon or other suitable material after the metallic contact members have parted, thereby causing all arcing produced by the current to occur between the blocks instead of between metallic contact members.

It is further an object to provide a metallic contact device constructed on the well known knife principle which will always give positive contact under a uniform and light tension such that the power derived from an ordinary clock movement will be sufficient to operate it.

It is further an object to provide a switch in which the metallic contact members may be readily shifted to present new contact surfaces should accidental arcing and burning injure the ones in use.

It is a further object to provide a switch opening and closing mechanism which may be driven by an ordinary clock movement to close and open a circuit periodically and have incorporated in its construction a means whereby it may be made to automatically render the switch inoperative during any predetermined number of periods of time.

Further objects of my invention will appear in the following specification and in the accompanying drawings and will be set forth more specifically in the subjoined claims.

In the said drawings, which show the preferred embodiment of my invention, and which are made a part of this specification, Figure 1 is a front elevation of the invention. Fig. 2 is a side elevation thereof. Fig. 3 is a top plan view, showing part of the frame broken away. Fig. 4 is a horizontal section and plan view taken approximately on the line 4—4 of Fig. 1 and looking in the direction indicated by the arrows. Fig. 5 is a side elevation of that part of the invention shown above the line 4—4 in Fig. 1. Fig. 6 is a similar view showing the working parts in a different position. Fig. 7 is a detent forming part of the invention. Fig. 8 shows a portion of the detent and a shift lever in conjunction with it.

My invention is well adapted to be used in conjunction with an electrically operated time recording register for the purpose of closing and opening an electric circuit thereto periodically. The time recording registers with which my device is well adapted to coöperate are designed ordinarily for use only during those hours of the day when employees are at work, and the register kept by these time recording registers is not kept in terms of hours and minutes but in terms of a certain number of time periods, generally tenths of hours. It is, therefore, desired to actuate these time recording registers once every tenth of an hour during those portions of the day when employees are at work. These portions of the day vary under different working conditions, and my device is made sufficiently adjustable to take care of these variations. With these and other objects in view I provide a frame work for my device comprising two vertical strips 10 and 10ª disposed somewhat apart in parallel planes, and rigidly held in such position by shouldered bolts 11 and 12 connecting the upper and lower adjacent ends of the strips 10 and 10ª. Upon the strip 10 of the framework and intermediate the ends thereof is mounted at right angles a strip 13 in a plane parallel to that of the strip 10 and bearing adjacent one of its ends a horizontal shelf 14. A somewhat similar strip 15 is mounted upon the strip 10ᵃ in a similar manner but nearer the upper than the lower end thereof. There is also mounted upon the strip 10ᵃ a short strip 16 adjustably secured to the strip 10ᵃ by the cap screw 16ᵃ. Preferably this whole framework is fastened to the same upright support 17 as the clock movement indicated by the numeral 18 in Fig. 2, 19 and 19ᵃ being posts or other suitable means for supporting the framework of my device.

Upon the strip 15 is mounted horizontally a post 20, carrying two blocks 21 and 22 of insulating material. Mounted intermediate its ends upon the upper surface of block 22 is an elongated flat electricity conducting switch arm 23, carrying at one end thereof a depending arm 24, to which is attached a post 25 threaded at its outer end. Upon this post 25 is mounted the female portion of an adjustable circular knife switch comprising two disks 26 and 27 concentrically and loosely mounted upon the post 25, and spaced apart by a collar 28 of smaller diameter and beveled at their peripheries on their adjacent sides. Another collar 29 separates the disk 26 from the arm 24, and acts as a stop. Upon the threaded outer end of the post 25 is mounted a threaded nut 30. The two collars and two disks just described are held in position by an elastic member 31 in the form of a coil spring interposed between the nut 30 and the outer side of the disk 27. By rotation of the nut 30 on the post 25 the tension of spring 31 may be varied and the force with which the disks 26 and 27 are held in position may be increased or diminished at will. The arm 23 is slotted as at 32. Rigidly mounted upon the cross strip 15 of the framework is a bumper block 33 of insulating material bearing two upright posts 34 and 35. Post 34 engages slot 32 of the arm 23 to prevent horizontal movement therein. Upon the opposite end of arm 23 is disposed at right angles and in an approximately vertical plane an offset arm 36 carrying a block 37 of carbon or other electric conducting material. A block 38 of insulating material is mounted upon the strip 15 of the framework and carries two binding posts 39 and 40 adapted to receive and hold the terminals 41 and 42 of an electric circuit. Electrical connection between the binding post 39 and the arm 23 is had by means of an electrical conductor indicated at 43. Mounted intermediate its ends upon the upper surface of the insulating block 21 is an elongated electricity conducting switch arm 44 joined for electrical communication with the binding post 40 by an electric conductor 45. The arms 23 and 44 lie approximately parallel and approximately in the same plane, except that that end of the arm 44 adjacent the female portion of the knife switch mounted on the arm 23 is bent upward in such manner that when the opposite ends of the arms 23 and 44 lie approximately in the same plane the switch end of the arm 44 will be above the switch end of the arm 23 and spaced therefrom, as shown in Fig. 5. The raised end of the arm 44 carries a depending arm 46 upon which is concentrically mounted in an approximately vertical plane a third disk 47, constituting the male portion of the circular knife switch whose female portion was described above as disposed on the adjacent end of arm 23. Disk 47 is slightly beveled at each edge of its periphery to facilitate its entrance between the disks 26 and 27 of the female portion carried at one end of the arm 23. Upon the lower surface of the upbent portion of the arm 44 is fastened a depending guide member 48 offset at its lower end to be approximately parallel to the arm 44, the offset portion of this guide member being adapted to contact with insulated bumper block 33. The lower portion of this member parallel to the arm 44 is slotted as at 48ᵃ for insertion on guide post 35. Fastened upon the upbent end of the arm 44 and adjacent the guide 48 is a weight 49. A portion of the opposite end of the arm 44 is bent down approximately at right angles to form a shoulder 50. Upon the under surface of the arm 44 and intermediate the insulating block 21 and the shoulder 50 is mounted a member 51 having two depending arms which support the ends of a small shaft 52. Pivoted by one of its ends to the shaft 52 is an auxiliary arm 53, which extends outwardly approximately the same distance as the adjacent end of arm 23, and has a downwardly depending shoulder 54 which carries a block 55 of carbon or other electric conducting material. The auxiliary arm 53 is slotted intermediate its ends. A depending post 56 is fastened to the arm 44 intermediate the shoulder 50 and the depending member 51 and engages the slot in the auxiliary arm 53. The lower end of the post 56 is threaded and carries a threaded nut 57. The auxiliary arm 53 is removably held in contact with the shoulder 50 by means of a compress spring 58 interposed between the nut 57 and the arm 53. The two blocks 37 and 55 are disposed one above the other in approximately the same plane and they form a carbon make-and-break for the knife switch to protect it from electric arcs. Fastened to the lower surface of block 21 is a rider arm 59 extending toward the circular knife switch described above and terminating adjacent the median line of the strip 10 of the frame. Fastened to the lower surface of block 22 is a similar rider arm 60 extending in the same direction as arm 59, but being slightly longer. In the preferred embodiment of the invention the difference in forward extension of these two arms is approximately one one-hundredth of an inch.

Mounted in the strips 10 and 10a of the framework is a horizontal operating shaft 61 extending both forwardly and rearwardly of the frame. The rear end of this shaft carries a crank 62 and a crank pin 63. In Fig. 2 reference numeral 18, as stated above, represents an ordinary clock movement. The minute arbor of this clock is indicated at 64 and imparts its movement to the operating shaft 61, preferably by means of a slotted arm 64a the slotted end of which engages the crank pin 63. Thus, it will be seen that the clock indicated at 18 turns the shaft 61 upon its axis at a uniform speed to make one revolution every hour. Frictionally mounted upon the shaft 61 by means of a relatively stiff elastic member 61a and directly below the arms 59 and 60 is a ratchet wheel 65 bearing, in the preferred embodiment of my invention, ten ratchet points 65a. The motive power of the clock indicated at 18 is not sufficient to overcome the friction of the mounting of the wheel 65, the friction being present merely for the purpose of adjusting the ratchet wheel 65 on the shaft 61. It will be noted that the blocks 21 and 22 are pivotally mounted upon the horizontal post 20 and that all the parts described as being fastened to the insulating blocks 21 and 22 are capable of relative oscillation with respect to the post 20. This relative oscillation is limited in its downward direction by the arms 59 and 60 which come in contact with the ratchet wheel 65, and by the arm 23 which comes in contact with the bumper block 33, and by the guide 48 fastened to the arm 44 which also comes in contact with the bumper block 33. A horizontal post 66 is set in the cross strip 15 of the framework and extends out over the arms 59 and 60 to arrest their oscillation in the upward direction. Let it be noted that the wheel 65 is of sufficient width to be disposed below both the arms 59 and 60, and that the ratchet points 65a are adapted to raise the arms 59 and 60 and let them drop separately owing to their difference in length as the wheel 65 is rotated upon the operating shaft 61. A pinion 67 is concentric with and secured to the ratchet wheel 65 and rotates with it, and, through a train of gear wheels 67a, 67b, 67c, conveys the motion of the shaft 61 to a cam shaft 68 mounted in the frame strips 10 and 10a. The bearing for the wheels 67a and 67b is mounted upon the strip 16 of the frame. The shaft 68 by means of the relation of the gears in the train of wheels 67a, 67b, and 67c, is made to turn at a uniform speed one revolution every twenty-four hours. Upon the forward end of the shaft 68 is concentrically mounted a cam wheel 69. The wheel 69 is rigidly mounted upon the shaft 68 and makes a complete turn once in every twenty-four hours. It bears extending beyond its periphery a plurality of adjustable cams, 70, 71, 72, 73, and 77, and it is preferably graduated, as shown in Fig. 1, upon its outer or forward face. The adjustable cams 70, 71, 72, 73, and 77, are held in position by cap screws 74, which pass through slots 75 in the cam wheel 69 or through slots 76 in the cams themselves. The cams are so curved as to be concentric with the shaft 68 and the wheel 69, and the cams 70, 71, 72, and 73, are determined in their concentric position by studs 78 which protrude from their sides and lie in contact with the periphery of the cam wheel 69. The cam 77 is disposed on the forward or outer surface of the circular plate 69 and spaced therefrom by means of a collar 79, and may be determined in its concentric position in any suitable manner. Cams 70, 71, 72, and 73 are in contact with the circular plate 69 and disposed on either side of it as convenience of adjustment necessitates. The space between the cam 77 and the circular plate 69 is as great or greater than the thickness of either of the cams 70, 71, 72, and 73.

Horizontally secured to the strip 10 of the frame and preferably disposed adjacent the periphery of the circular plate 69 is a tubular bearing 80 engaging a horizontal shaft 81 to which is fastened a swinging detent lever comprising two relatively adjustable portions 82 and 83. The shaft 81 is free to rotate in the bearing 80 and also free to slide therein. The part 82 of the detent lever is rigidly attached to the shaft 81, but the part 83 is pierced as at 83a for pivotal engagement with the shaft 81. The part 83 of the detent lever is also slotted as at 84 and through the slot passes a cap screw 85, which engages a threaded perforation in the part 82 of the detent lever. Upon the end of the part 83 opposite to the end pierced as at 83a is fastened a weight 86. Rigidly fastened to the part 83 of the detent lever and extending forwardly therefrom is a post 87 having two flattened portions forming an edge as at 87a, and adapted to ride upon the cams 70, 71, 72, 73, and 77, the cams being beveled off at the ends which first come in contact with the post 87 in order to facilitate the action of post 87 in mounting the cams. The part 82 of the detent lever is preferably curved as at 82a around the operating shaft 61 to avoid contact therewith and extends above the operating shaft 61 to a point approximately at the upper level of the ratchet wheel 65 and its ratchet points 65a, where it is notched as at 88 for engagement with the arm 59. The detent lever carrying the above described attached parts is adapted to be shifted forward and backward by a shift lever 89 (see Fig. 8) which lies upon the shelf 14 and is pivoted thereto by a rivet 90 bearing a head and having an elastic member 91 of considerable stiffness interposed between the head of the rivet and the upper surface of the shift lever. The outer end of the shift lever 89 is preferably upturned as at 92 for convenience in operating. The inner end of the shift lever 89 is similarly upturned as at 93 and slotted for engagement with the part 82 of the detent lever. To prevent the detent lever being swung into contact with the ratchet wheel 65 a post 95 is set uprightly in the shelf 14 which serves to arrest the motion of the shift lever before the part 82 of the detent lever touches the ratchet wheel 65. To avoid shifting the part 82 of the detent lever so far forward as to clear the forward side of the arm 59 the upturned end 93 of the shift lever 89 is made broad enough to contact with the strip 10 before the part 82 has shifted too far forward. It is preferable but not essential that the detent lever be constructed of two parts as 82 and 83. For convenience in indicating the time of day I have shown mounted upon the operating shaft 61 a minute hand 96, a pinion 97 and a train of wheels 98, 99, and 100 operating an hour arbor 101 and an hour hand 102, the wheels 98 and 99 being in any convenient manner journaled by means of an attachment on the strip 10 of the frame, and for further convenience in indicating the time of day I have shown three posts 103, 104, and 105, adapted to secure a clock dial if such be desired.

The electric circuit by which the above mentioned time recording registers are operated and which it is desired to close periodically during given portions of the day is represented by the terminal wires 41 and 42. In my construction I have shown both a contact through a circular knife switch and a contact through two blocks 37 and 55. The circular knife switch is used for the purpose of making a positive contact between the arms 23 and 44 when the circuit is closed and the blocks 37 and 55 are used to close the circuit just ahead of the action of the knife switch and to break the circuit just after the break in the knife switch; in other words, to take the arc which is generally present in making and breaking electrical contacts. The closing of the electric circuit in my device is determined by relative motion of the arms 23 and 44, which is in turn determined by the rotation of the ratchet wheel 65 and the arms 59 and 60 (see Fig. 6) which ride upon the ratchet points 65ª. By reason of being mounted upon the insulating blocks 21 and 22, the rider arms 59 and 60 carry no electricity, their operation being purely mechanical. As they rise together upon one of the ratchet points 65ª they carry upward the two arms 23 and 44 which are out of contact for the reason that the arm 44 is upbent and that the shoulder 50 holds the blocks 37 and 55 apart. The ratchet points 65ª are sufficiently broad to allow both the arms 59 and 60 to ride upon them at once. As one of the ratchet points 65ª passes beneath the free ends of the arms 59 and 60, the arm 59, by reason of being somewhat shorter than the arm 60, is the first drop from the ratchet point. Its action in thus dropping off is facilitated by the weight 49 and as it drops off and carries down with it the arm 44, the disk 47 upon the arm 44 drops between the disks 26 and 27 upon the arm 23, making electrical contact between the arms 44 and 23. The blocks 37 and 55 at the opposite adjacent ends of the arms 44 and 23 are so adjusted that they come into contact just before the two parts of the knife switch come into contact. The difference in length of the arms 59 and 60 is preferably very slight, thereby admitting of a very few moments of electrical contact between the arms 23 and 44, for the continued turning of the ratchet wheel 65 causes the arm 60 to drop from one of the ratchet points 65ª very shortly after the arm 59 has dropped therefrom. The dropping of the arm 60 is facilitated by the weight of the female portion of the knife switch mounted upon the arm 23 and when both the arms 59 and 60 have fallen off one of the ratchet points 65ª into the hollow between the ratchet points the arms 23 and 44 have resumed the same relative position which they had when both were mounted upon the highest crest of the ratchet point. In other words, the arms 23 and 44 separate the instant that the arm 60 falls from one of the ratchet points to its normal position beside the arm 59, this separation breaking all electrical contact between the arms 23 and 44 both at the knife switch and through the blocks 37 and 55, the break however between the blocks coming subsequent to the break in the knife switch. In the present embodiment of my invention the ratchet wheel 65ª makes a complete revolution every hour and having ten ratchet points the electric circuit is therefore closed and opened once every tenth of an hour. The arm 59 is of sufficient width both to ride upon the ratchet wheel 65 and to extend forwardly therefrom to admit of engagement with the notched portion 88 of the detent lever in any of the different shifted positions of the detent lever. To admit of the periodical closing and opening of the electric circuit, the part 82 of the detent lever must be held away from contact with the arm 59, which is accomplished by the riding of the post 87 upon the various cams mounted on the circular wheel 69. When it is desired that the electrical circuit shall remain open during a portion of the twenty-four hours, such for instance, as the night period from cessation of work in the afternoon to the resuming of work the next morning, the cams on the cam wheel 69 are spaced apart from each other and into this space the rigid post 87 drops, which dropping throws the detent lever up against the free end of the arm 59, and when the arm 59 has risen nearly to the maximum height of one of the ratchet points 65ª the notched portion 88 of the detent lever engages the free end of the arm 59 and arrests its oscillation, while the arm 60 idles on the ratchet wheel. The throwing forward of the detent lever is facilitated by the weight 86. When it is desired to resume the periodical closing of the circuit during the night period above mentioned, the shift lever is operated to shift the detent lever forward sufficiently to cause the post 87 to mount and ride upon the cam 77, it being remembered that the cam 77 is spaced forward of the circular plate 69 and the cams 70, 71, 72, and 73, so that without this shifting of the detent lever and the rigid post 87 the post 87 would lie within the outer cam periphery and back of the cam 77. The mounting of the post 87 upon the cam 77 throws the detent lever out of contact with the free end of the arm 59, allowing the switch arms to resume their periodical closing and opening of the electrical circuit.

I claim:

1. The combination with a clock; an electric switch device comprising two pivoted insulated members interposed in the circuit, and male and female members carried upon adjacent ends of said insulated members and adapted to contact to close the circuit and to separate to open the circuit; time-controlled means for periodically causing said closing and opening of the circuit comprising an operating shaft driven by the clock, a ratchet wheel mounted upon said shaft and rotating therewith, a plurality of rider arms secured to the pivoted insulated members and adapted to ride upon said ratchet wheel to actuate the switch device; and time controlled means for arresting said periodic closing and opening of the circuit during predetermined intervals.

2. The combination with a clock; an electric switch device comprising two pivoted insulated members interposed in the circuit, and male and female members carried upon adjacent ends of said insulated members and adapted to contact to close the circuit and to separate to open the circuit; time-controlled means for periodically causing said closing and opening of the circuit comprising an operating shaft driven by the clock, a ratchet wheel mounted upon said shaft and rotating therewith, a plurality of rider arms secured to the pivoted insulated members and adapted to ride upon said ratchet wheel to actuate the switch device; and time-controlled means for arresting said periodic closing and opening of the circuit during predetermined intervals, comprising a pivoted detent, a rider post secured to the detent adjacent one end thereof, a cam wheel adapted to rotate at a uniform speed and impart movement to said detent, the detent being adapted by said movement to engage one of said rider arms and withhold the male and female members from contact.

3. The combination with an electric circuit of a switch device comprising two insulated members pivoted intermediate their extremities, interposed in the circuit adjacent each other, carrying on two of their adjacent extremities a knife switch and on their opposite adjacent extremities a make-and-break of carbon or other electricity conducting material, said insulated members being adapted to close and open said circuit by the contact and separation of their adjacent extremities, time controlled means for periodically operating said insulated members to close and open said circuit, and time controlled means for arresting said periodic closing and opening during predetermined intervals.

4. The combination with an electric circuit of a switch device comprising two insulated members interposed in the circuit adjacent each other, carrying on two of their adjacent extremities a knife switch and on their opposite adjacent extremities a make-and-break of carbon or other electricity conducting material, said insulated members being adapted to close and open said circuit by the contact and separation of their adjacent extremities, time controlled means for periodically operating said insulated members to close and open said circuit and time controlled means for arresting said periodic closing and opening during predetermined intervals.

5. The combination in an electric circuit of a switch comprising a plurality of switch arms adapted by the contact and separation of their adjacent ends to close and open an electric circuit, a plurality of rider arms secured to and insulated from said switch arms and adapted to impart relative movement to said switch arms to cause their adjacent ends to come into contact and to separate, time controlled means for periodically causing the said contact and separation, and time controlled means for arresting said periodic closing and opening during predetermined intervals.

6. A switch for electric circuits combining a plurality of switch arms adapted to close and open an electric circuit by their contact and separation, a plurality of rider arms of differing lengths respectively secured to and insulated from said switch arms, time controlled means for periodically imparting relative movement to said rider arms, and time controlled means for arresting said relative movement during predetermined intervals, comprising a detent bearing a rider post, and a cam wheel bearing adjustably and concentrically mounted cams protruding beyond its periphery, said wheel being adapted to rotate at a uniform speed and impart motion through said rider post to said detent.

7. A switch for electric circuits combining a plurality of switch arms adapted to close and open an electric circuit by their contact and separation, a plurality of rider arms of differing lengths respectively secured to and insulated from said switch arms, time controlled means for periodically imparting relative movement to said rider arms, comprising a ratchet wheel adapted to rotate at a uniform speed and to carry said rider arms and impart relative movement thereto, and time controlled means for arresting said relative movement during predetermined intervals comprising a detent and an adjustable cam wheel adapted to engage said detent with one of said rider arms during said predetermined intervals.

8. The combination of a switch for electric circuits; time-controlled means for periodically closing and opening said switch; and time-controlled means for arresting said periodic closing and opening during predetermined intervals; said switch comprising two switch arms, male and female members carried upon adjacent ends thereof and adapted by their contact to conduct electricity, the opposite adjacent ends of the switch arms carrying a make-and-break adapted to close an electric circuit before the contact of the male and female members and to open the circuit after the separation of those members; said means for periodically closing and opening the switch comprising two rider arms secured to said switch arms and adapted to operate said switch arms by relative movement, a time-controlled ratchet wheel adapted to rotate at a uniform speed and impart relative movement to the rider arms; said arresting means comprising a pivotally mounted detent, a time-controlled cam wheel bearing concentric cams protruding from its periphery, a rider post attached to said detent adjacent one extremity thereof and adapted to ride upon said cams and to fall therebetween during said predetermined intervals and to carry said detent into engagement at its opposite end with one of the rider arms to withhold that arm from said relative movement during said intervals.

9. The combination of a switch for electric circuits, a make-and-break for protection of said switch from arcing, time-controlled means for periodically operating said switch comprising an operating shaft adapted to rotate one revolution each hour and bearing a ratchet wheel flexibly mounted thereon, having a plurality of ratchet points, means in engagement with said ratchet points for imparting relative movement to said switch arms, a detent adapted by its movement to arrest said closing and opening during predetermined intervals, a cam wheel, means for imparting the motion of said operating shaft to said cam wheel to rotate it one revolution in twenty-four hours, and a rider post upon said detent adapted to ride upon said cam wheel and impart said movement to said detent.

10. The combination of a switch for electric circuits, a make-and-break for protection of said switch from arcing, time-controlled means for periodically operating said switch comprising an operating shaft adapted to rotate one revolution each hour and bearing a ratchet wheel flexibly mounted thereon having a plurality of ratchet points, means in engagement with said ratchet points for imparting relative movement to said switch arms, a detent adapted by its movement to arrest said closing and opening during predetermined intervals, a cam wheel bearing concentrically mounted adjustable cams protruding beyond its periphery, means for imparting the motion of said operating shaft to said cam wheel to rotate it one revolution in twenty-four hours, a rider post upon said detent adapted to ride upon said cams and to fall between them during said predetermined intervals and thereby impart said movement to said detent.

11. The combination of a switch for electric circuits, means for periodically closing and opening said switch, a detent flexibly mounted and adapted by its movement to arrest said periodic closing and opening, means for operating said detent comprising a time-controlled cam wheel adapted to rotate one revolution in twenty-four hours, a plurality of adjustable cams secured thereto concentric therewith and forming a broken outer periphery upon said cam wheel, a rider post secured to said detent and adapted to ride upon said outer periphery and to fall into the broken portions therein, thereby imparting said movement to said detent.

12. The combination of a switch for electric circuits, means for periodically closing and opening said switch, a detent flexibly mounted adapted by its movement to arrest said periodic closing and opening, means for operating said detent comprising a time-controlled cam wheel adapted to rotate one revolution in twenty-four hours, a plurality of adjustable cams secured thereto, concentric therewith and forming a broken outer periphery upon said cam wheel, a rider post secured to said detent adapted to ride upon said outer periphery and to fall into the broken portions therein and impart said movement to said detent, one of said cams being spaced from said cam wheel sufficiently to clear said rider post and means for shifting said detent and rider post to engage said spaced cam comprising a shift lever pivoted intermediate its extremities and in flexible engagement with said detent.

13. The combination in switch mechanism for electric circuits of a switch, time-controlled means for operating said switch periodically, time-controlled means for rendering said switch operating means inoperative during predetermined intervals, and manually operable means for rendering said switch operating means operable during said predetermined inoperative intervals.

14. The combination of a switch for electric circuits, time controlled means for periodically closing and opening said switch, time controlled means for arresting said periodic closing and opening during predetermined intervals, and means for causing said periodic closing and opening at will during said predetermined intervals.

15. The combination with an electric circuit of a switch; time-controlled means for periodically closing and opening said switch; means for arresting said periodic closing and opening during predetermined intervals comprising a detent pivotally and slidably mounted and adapted by pivotal movement to arrest the operation of said switch closing and opening means, a rider post fixed upon one extremity of the detent, a time-controlled cam wheel adapted to impart said pivotal movement to the detent; and means for causing a resumption of the operation of said switch closing and opening means during normally inoperative intervals comprising a cam concentric with said cam wheel and spaced from the rider post, and a shift lever adapted to slide said detent and rider post to position the post in the path of said spaced cam.

16. The combination of a clock movement, an electrical switch device comprising two pivoted insulated members provided with circuit closing means, appliances driven by the clock movement for periodically operating the switch device, and time controlled means for arresting said periodic operation during predetermined intervals.

17. The combination of a clock movement, an hour cam wheel mounted on the center arbor thereof, a day cam wheel geared to said hour cam wheel to rotate at a lesser speed than the hour cam wheel, a switch for electric circuits actuated periodically by said hour cam wheel, and mechanism actuated by said day cam wheel and operatively related to said switch for arresting said periodic actuation during predetermined intervals.

In testimony whereof I have signed my name to this specification, in the presence of two subscribing witnesses, on this 8th day of October A. D. 1912.

HORACE B. McCABE.

Witnesses:
HAROLD G. ROCKWELL,
CHARLES H. SEEM.